United States Patent [19]

Homola et al.

[11] Patent Number: 4,960,609

[45] Date of Patent: Oct. 2, 1990

[54] PROCESS FOR BONDING LUBRICANT TO A THIN FILM MAGNETIC RECORDING DISK

[75] Inventors: Andrew M. Homola, Morgan Hill; Li-Ju J. Lin, San Jose; David D. Saperstein, Portola Valley, all of Calif.

[73] Assignee: International Business Machines Corporation, Armonk, N.Y.

[21] Appl. No.: 434,151

[22] Filed: Nov. 13, 1989

[51] Int. Cl.$^5$ .............................................. B05D 3/06
[52] U.S. Cl. ...................................... 427/38; 427/130; 427/131; 427/430.1; 428/64; 428/695; 428/900
[58] Field of Search .............. 427/38, 130, 131, 430.1; 428/64, 695, 900

[56] References Cited

U.S. PATENT DOCUMENTS

| 4,503,125 | 3/1985 | Nelson et al. | 428/408 |
|---|---|---|---|
| 4,552,820 | 11/1985 | Lin et al. | 428/611 |
| 4,610,911 | 9/1986 | Opfer et al. | 428/213 |
| 4,778,582 | 10/1988 | Howard | 204/192.15 |

Primary Examiner—Bernard Pianalto
Attorney, Agent, or Firm—Thomas R. Berthold

[57] ABSTRACT

In the manufacture of a thin film metal alloy or metal oxide magnetic recording disk, a fluoroether lubricant is bonded to the carbon or hydrogenated carbon overcoat of the disk. The lubricant is applied to the carbon overcoat by dipping the disk in a solution of the lubricant. The lubricated disk is then exposed to the plasma of an inert gas, such as nitrogen. The resulting disk contains a layer of lubricant which is bonded to the disk surface so as to be resistant to spin-off and which has a relatively uniform thickness so as to substantially eliminate the problems of stiction during the operation of the disk file.

6 Claims, No Drawings

PROCESS FOR BONDING LUBRICANT TO A THIN FILM MAGNETIC RECORDING DISK

TECHNICAL FIELD

This invention relates to a process for the manufacture of a thin film metal alloy or metal oxide magnetic recording disk, and in particular to a process for the bonding of a liquid lubricant to the carbon protective overcoat on the disk.

BACKGROUND OF THE INVENTION

Thin film magnetic recording disks typically comprise a substrate, such as an aluminum-magnesium (AlMg) alloy with a nickel-phosphorous (NiP) surface coating, a magnetic film of either a cobalt based metal alloy or a gamma iron oxide film, and a protective overcoat, such as a sputter-deposited amorphous carbon or hydrogenated carbon film, formed over the magnetic layer. A liquid lubricant, such as a fluoroether lubricant, is often applied to the carbon or hydrogenated carbon overcoat. A general description of the structure of such thin film disks is given in U.S. Pat. Nos. 4,610,911 to Opfer, et al., and 4,552,820 to Lin, et al. An amorphous film for use as a protective overcoat is described in U.S. Pat. Nos. 4,503,125 to Nelson, et al. and an amorphous hydrogenated carbon film is described in assignee's U.S. Pat. No. 4,778,582 to Howard.

There are several problems with such disks which are caused essentially by the liquid lubricant on the protective overcoat. In particular, because there is no means to specifically retain the liquid lubricant onto the overcoat, the lubricant tends to deplete due to spin-off during operation of the disk file. In addition, variations in thickness of the lubricant over the disk surface can cause problems in operation of the disk file. If the lubricant layer is too thin the air bearing slider which supports the read/write head can cause wear of the disk surface. If the lubricant layer is too thick the slider can become stuck to the disk surface when the disk file is turned off. This static friction or "stiction" is caused by a variety of factors, including viscous shear forces and surface tension created by the lubricant between the protective overcoat and the slider. This stiction can result in damage to the head or disk when the slider suddenly breaks free from the disk surface when disk rotation is initiated. Also, because the suspension which supports the slider is relatively fragile in order to permit the slider to "fly" above the disk surface, sudden rotation of the disk in the presence of stiction can also damage the suspension.

SUMMARY OF THE INVENTION

The present invention is a process for grafting or bonding the fluoroether lubricant to the carbon or hydrogenated carbon protective overcoat. The fluoroether lubricant is first applied to the disk and thereafter exposed to a plasma of an essentially inert gas. The plasma exposure bonds the lubricant to the carbon overcoat. The lubricant which is bonded to the carbon overcoat by the plasma treatment is resistant to spin-off and has a thickness uniformity which substantially eliminates the occurrence of stiction during operation of the disk file.

For a fuller understanding of the nature and advantages of the present invention reference should be made to the following detailed description.

DESCRIPTION OF THE PREFERRED EMBODIMENTS

The lubricants were applied to the carbon overcoat surfaces of the disks from dilute solutions of the liquid lubricants in 1,1,2-trichlorotrifluoroethane (Freon). The lubricants were applied to the various disks by either dipping, evaporation, spin coating or wiping. The lubricants used were the perfluoropolyethers (PFPE), i.e., Fomblin Z and Y lubricants made by Montedison, Krytox made by Dupont and Demnum made by Daikin, and their difunctional derivatives containing various reactive end groups, e.g., hydroxyl (Fomblin Z-DOL), piperonyl (Fomblin AM2001), and isocyanate (Fomblin Z-DISOC), all manufactured by Montedison. The difunctional derivatives are referred to as reactive fluoroether lubricants. The chemical structures of the lubricants are given in Table 1.

TABLE 1

| Lubricant | STRUCTURE OF PERFLUOROETHER LUBRICANTS Formula |
|---|---|
| Fomblin Z-25 | $CF_3O-(CF_2CF_2O)n-(CF_2O)m-CF_3$ |
| Fomblin Z-15 | $CF_3O-(CF_2CF_2O)n-(CF_2O)m-CF_3$ |
| Fomblin Z-03 | $CF_3O-(CF_2CF_2O)n-(CF_2O)m-CF_3$ |
| Fomblin Z-DOL | $HOCH_2CF_2O-(CF_2CF_2O)n-(CF_2O)m-CF_2CH_2OH$ |
| Fomblin AM2001 | $Piperonyl-OCH_2CF_2O-(CF_2CF_2O)n-(CF_2O)m-CF_2CH_2O\text{-piperonyl}$[1] |
| Fomblin Z-DISOC | $OCN-C_6H_3(CH_3)-NHCO-CF_2O-(CF_2CF_2O)n-(CF_2O)m-CF_2-CONH-C_6H_3(CH_3)-NCO$ |
| Fomblin YR | $F(CFCF_2O)n-(CF_2O)m-CF_2CF_3$ <br> $\qquad\quad \vert$ <br> $\qquad\quad CF_3$ |
| Demnum | $F(CF_2CF_2CF_2O)n-CF_2CF_3$ |
| Krytox | $F(CFCF_2O)n-CF_2CF_3$ <br> $\qquad\quad \vert$ <br> $\qquad\quad CF_3$ |

[1] 3,4-methylenedioxybenzyl

In the dipping process, the thickness of the lubricant coating is determined by controlling the withdrawal speed and the concentration of lubricant in the solution. The lubricant layer thickness is also sensitive to lubricant type, the surface of the substrate and the ambient conditions.

After the disks were lubricated in this manner, plasma treatments were carried out by exposure of the lubricated carbon surfaces of the disks to a nitrogen ($N_2$) plasma for 2 to 5 minutes in a LFE plasma system operating at 13.6 MHz. Nitrogen gas of purity 99.999% was used without further purification at a flow rate of 20 cc/min, with the pressure maintained at 0.2 torr. The disk samples were placed horizontally in the plasma chamber. After plasma treatment the unbonded component of the lubricant was removed by thoroughly washing the disks with Freon.

Nitrogen plasma grafting of fluoroether lubricants to the surface of the carbon overcoat was demonstrated with both non-reactive and reactive lubricants using powers in the range of 20 W to 250 W. It was found that the level of lubricant attachment to the carbon overcoat varies considerably with plasma power and time of exposure for a fixed initial lubricant thickness. Table 2 is a comparison of lubricant thicknesses, after irradiation of 30 Å of Z-DOL on the carbon overcoat surfaces with a nitrogen plasma for 2 minutes at different powers, with lubricant thicknesses after Freon rinse.

TABLE 2
EFFECT OF ROOM TEMPERATURE
$N_2$ PLASMA ON 30 Å Z-DOL

| Plasma Conditions | Thickness After Plasma Treatment (Å) | Thickness After Freon Rinse (Å) |
|---|---|---|
| None | 30 | 0 |
| 20 Watt/2 min | 25 | 18 |
| 50 Watt/2 min | 23 | 15 |
| 75 Watt/2 min | 15 | 10 |
| 100 Watt/2 min | 5 | 2 |

Lubricant thickness measurements were made by a X-ray photoelectron spectroscopy (XPS) and Fourier transform infrared analysis (FTIR). As clearly shown by the data in Table 2, the plasma treatment enhances the adhesion of the lubricant to the surface of the carbon overcoat.

In the experimental results described above, the disks with the bonded lubricant were thereafter washed in Freon to remove any unbonded lubricant. However, it is possible in the manufacturing of the disks to control the thickness of the lubricant applied during the dipping process, such that following plasma treatment it is not necessary to remove unbonded lubricant. While the disks used in these experimental results contained a hydrogenated carbon overcoat (i.e. an essentially carbon overcoat containing less than 20 atomic percent hydrogen), the process is fully applicable for disks having an essentially amorphous carbon film without substantial hydrogen present since it is believed that the lubricant is bonded to carbon atoms in the overcoat. The preferred inert gas is $N_2$. However, other gases which are "inert", i.e. essentially not chemically reactive with the fluoroether lubricant or the carbon overcoat, would also be suitable in the present process. An example of such a gas is argon. In the experiment described above, a reactive lubricant, Z-Dol, with difunctional end groups is used. If a non-functional lubricant is used, such as Fomblin Z-15 or YR made by Montedison, essentially the same results are obtained except that the power and exposure time are somewhat larger to produce the optimal bonding.

While the preferred embodiment of the present invention has been described in detail, it should be apparent to those skilled in the art that modifications and adaptations to that embodiment may occur to one skilled in the art without departing from the scope of the present invention as set forth in the following claims.

What is claimed is:

1. A process for bonding a fluoroether lubricant to a thin film magnetic recording disk of the type having a protective overcoat consisting essentially of carbon, the process comprising the steps of:
   applying a fluoroether lubricant to the carbon overcoat surface; and
   thereafter exposing the lubricated disk to a plasma of an essentially inert gas.

2. The process according to claim 1 wherein the step of exposing the lubricated disk to an essentially inert gas plasma comprises the step of exposing the lubricated disk to a nitrogen gas plasma.

3. The process according to claim 1 wherein the step of applying the fluoroether lubricant comprises the step of dipping the carbon overcoated disk into a solution containing the fluoroether lubricant.

4. The process according to claim 1 further comprising the step of, after exposing the lubricated disk to the plasma, removing the unbonded lubricant from the disk.

5. The process according to claim 1 wherein the step of applying the fluoroether lubricant comprises the step of applying a difunctional derivative of a perfluoropolyether lubricant.

6. The process according to claim 1 wherein the step of applying the fluoroether lubricant comprises the step of applying a non-reactive perfluoropolyether lubricant.

* * * * *